(No Model.)

L. A. STAMAN.
HAY ROPE TRIP.

No. 558,998.  Patented Apr. 28, 1896.

WITNESSES:
G. P. Rolser.
E. R. Edwards.

INVENTOR
Levi A. Staman

BY
ATTORNEY.

UNITED STATES PATENT OFFICE.

LEVI ANDREW STAMAN, OF WALNUT, IOWA.

HAY-ROPE TRIP.

SPECIFICATION forming part of Letters Patent No. 558,998, dated April 28, 1896.

Application filed April 8, 1895. Serial No. 545,030. (No model.)

*To all whom it may concern:*

Be it known that I, LEVI ANDREW STAMAN, residing at Walnut, in the county of Pottawattamie and State of Iowa, have invented certain useful Improvements in Hay-Rope Hitches or Trips; and I do hereby declare that the following is a full, clear, and exact description of the invention, such as will enable others skilled in the art to which it appertains to make and use the same, reference being had to the accompanying drawings, which form a part of this specification.

This invention has relation to a new and novel detaching device adapted more particularly to be used in working horse hay-forks.

Figure 1:
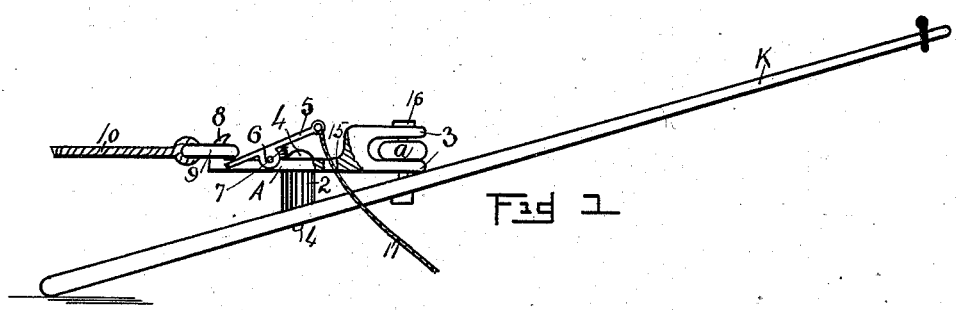
Figure 2:

In the accompanying drawings, Figure 1 shows my improved detaching device with a portion broken away and secured to an ordinary tongue, while Fig. 2 shows an enlarged detached detail thereof.

In the use of my device I employ an ordinary bar K, which forms the main support for my device and may be in the form of a large tongue when used with two horses or comprise a shaft when used with one animal, to a convenient point of which I secure my detaching device, comprising the bar A, which is provided at a suitable point with a boss 2. This bar is dragged over the ground and is the means wherewith the device is operated. One end of this bar is bifurcated to form the ears 3, between which an ordinary doubletree or singletree is held, to which the animal or animals is secured. The tree is held by means of an ordinary bolt 16 passing through these ears 3. The remaining end of the bar A has an upwardly-extending hook 8, over which an ordinary chain-link 9 is adapted to work, which link forms the terminating end of an ordinary hoisting cord or cable, to which the hay-fork is secured. Pivotally secured to this bar A is a spring-bar 5, which has its end 20 bifurcated, so as to stride the hook 8, and is secured to the bar A by means of two ordinary ears 6, being held by means of a pin 12. Working below this bar 5 and against bar A is an ordinary coil-spring 7, adapted to continuously force the bifurcated end 20 into its lowest position in striding the bar A. The rear end of this bar 5 is provided with an ordinary operating-cord 11, which passes through an opening 15 within the bar A, which cord is held by the operator, who, when he wishes to release the fork and load, simply draws the cord to upset the bar 5 in releasing the link 9.

The device is secured to the bar K by means of a bolt 4, passing through the boss 2, and also by means of the king-bolt 16, passing through the bifurcation 3 and the pole K.

The device is simple and is so arranged that it can be attached to any ordinary bar or bars.

Now, having thus described my said invention, what I claim as new, and desire to secure by United States Letters Patent, is—

In a detaching device the combination with a suitable, portable main supporting-bar, of an approximately H-shaped blank, A, the stems, 3, 3, of which are adapted to accommodate a singletree, a, said blank being provided with an opening, 15, and the forward terminating hook, 8, of the spring-rider, 5, movably secured to said blank and actuated by means of the spring, 7, said rider being bifurcated at the end and normally lying below said hook, 8, and the operating-cord, 11, secured to said rider, all substantially as and for the purpose set forth.

In testimony whereof I affix my signature in presence of two witnesses.

LEVI ANDREW STAMAN.

Witnesses:
CHAS. M. BURKE,
A. E. KINCAID.